July 21, 1936.  C. C. FARMER  2,048,329
MAGNETIC RAIL BRAKE
Filed May 3, 1934  2 Sheets-Sheet 2
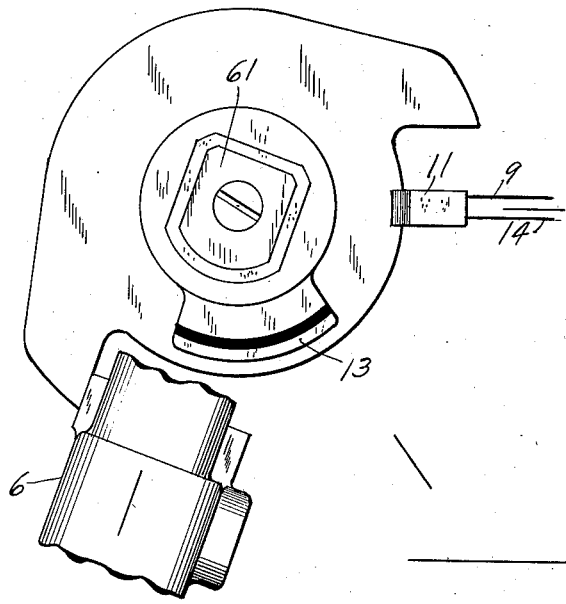
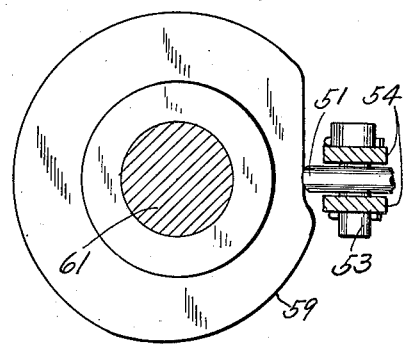
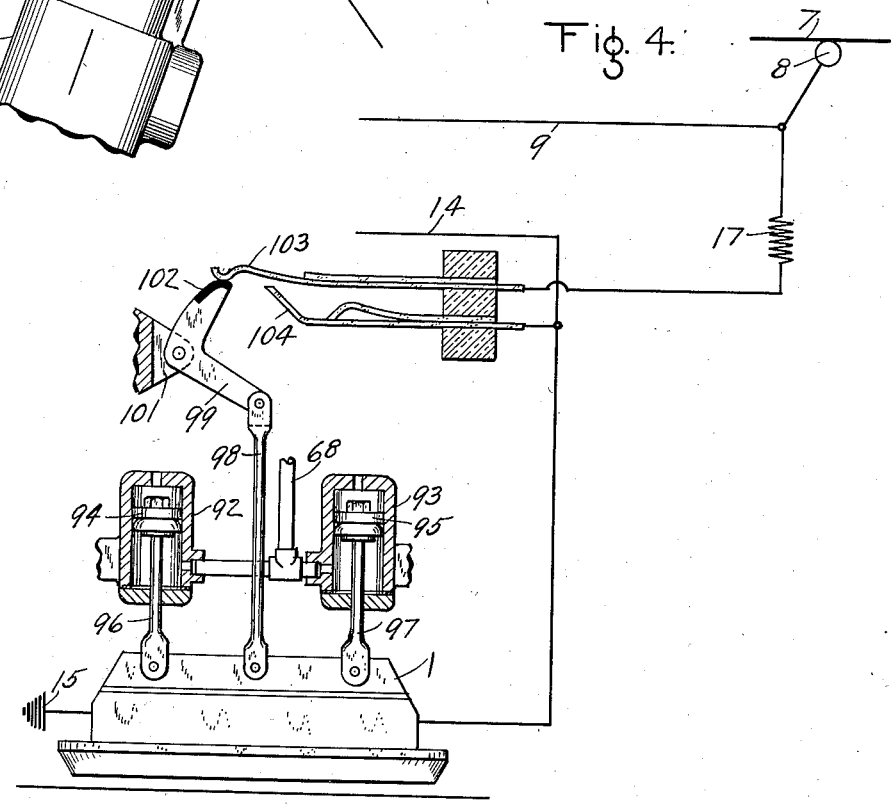
*INVENTOR*
CLYDE C. FARMER
BY
*ATTORNEY*

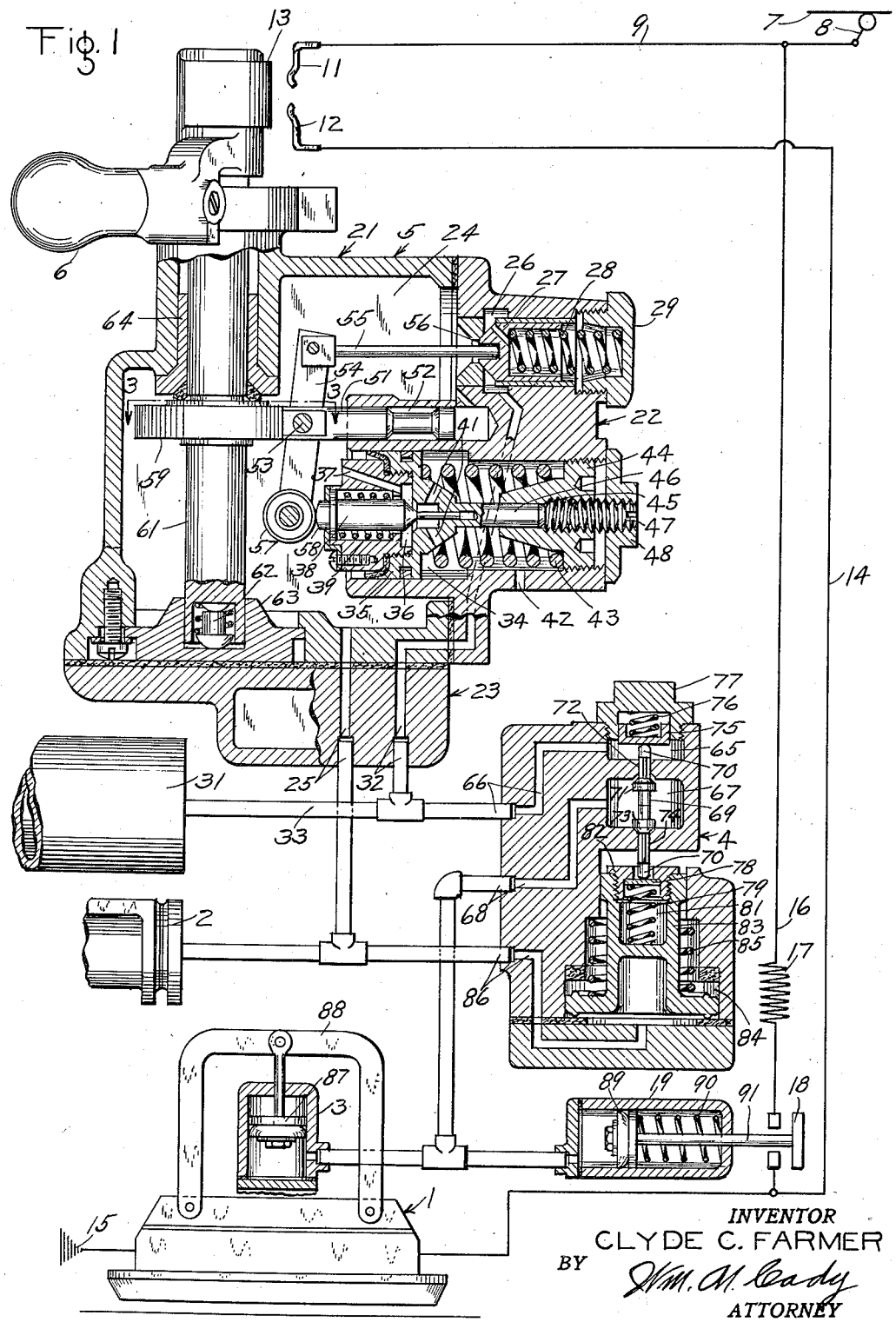

Patented July 21, 1936

2,048,329

UNITED STATES PATENT OFFICE 2,048,329

MAGNETIC RAIL BRAKE

Clyde C. Farmer, Pittsburgh, Pa., assignor to The Westinghouse Air Brake Company, Wilmerding, Pa., a corporation of Pennsylvania Application May 3, 1934, Serial No. 723,660

15 Claims. (Cl. 303—3)

This invention relates to a brake equipment for traction vehicles and railway trains employing both magnetic brakes applied to the track rail and brakes applied directly to the wheels of the vehicle.

A desirable type of brake equipment to use with high speed traction vehicles and railway trains is one employing both a brake for providing braking torque to the wheels of the vehicle and a braking effect directly applied to the rails. The brake for applying a braking torque to the wheels of the vehicle may be the well known fluid pressure brake, while the track brake may be a magnetic brake controlled either by fluid pressure means, electrical means, or a combination of the two. In such an equipment a greater braking effect can be produced by operation of both the friction and magnetic brakes than can be obtained by operation of either the fluid pressure, or the friction brake, alone.

In the present manner of operating track brakes the track brake shoe is permitted to come into contact with the track rail for braking prior to application of the braking force. It is, therefore, possible for the track brake shoe to remain in contact with the rail for a time without being energized and to bounce about on the rail while the car is in motion.

It is an object of my invention to provide means for slightly energizing the track brake shoes when they come in contact with the track rail to thus prevent the shoes from bouncing about on the rails and causing damage or making unnecessary noise.

Another object of my invention is to provide for lowering the track brake shoe and slightly energizing it simultaneously with the application of the braking force upon the wheels of the vehicle.

Further objects will be apparent from the following description taken in connection with the embodiment of the invention illustrated in the accompanying drawings in which:

Fig. 1 is a diagrammatic view of apparatus and circuits comprising one operative embodiment of the invention.

Fig. 2 is a plan view of a portion of the controller device.

Fig. 3 is a view partly in plan and partly in section along the line 3—3 in Fig. 1, showing the operating cam.

Fig. 4 is a view illustrating another embodiment of the apparatus for slightly energizing the track shoe.

In the illustrated embodiment of my invention the track brake is shown as comprising a single magnetic track shoe 1 and the friction brake is shown as comprising a single brake cylinder 2. It will be apparent that any other number of track braking devices or brake cylinders may be used according to the braking required.

The magnetic shoe device 1, which may be of any suitable type, is adapted to be held in a raised position above the tracks when not in use by a raising cylinder 3 that is controlled by a raising cylinder control valve 4 in accordance with the operation of a brake valve device 5. The brake valve device is provided with an operating handle 6 that controls it and also the energizing circuit for the magnetic track shoe device 1, which circuit extends from the overhead conductor 7, through trolley 8, conductor 9, contact members 11 and 12 of an electric controller that are adapted to be bridged by a moveable contact member 13, conductor 14, through the winding of the magnetic track shoe device to ground at 15. While a simplified electrical circuit is here disclosed for energizing the magnetic track shoe device any suitable electric controller may be employed for this purpose such as that disclosed in Serial No. 715,512, filed Jan. 23, 1934, John W. Logan, Jr., for Magnetic brake control, assigned to the same assignee as this application. A circuit for controlling a slight energization of the magnetic track shoe device is completed from the trolley 8, through conductor 16, resistor 17, the switch 18, the coil of the shoe device and to ground at 15. The switch 18 is controlled by a pressure cylinder 19 in accordance with the operation of the control valve device 4.

The brake valve device 5 is preferably of the self-lapping type and comprises a main casing section 21, a valve section 22 and a bottom section 23, which together define a pressure chamber 24 having constant communication with the brake cylinders by way of pipe and passage 25.

The valve section 22 is provided with a supply valve chamber 26 in which is positioned a supply valve 27 that is urged toward its seated position by a spring 28 that extends from the valve to a cap nut 29 in the outer wall of the casing structure 22.

The supply valve 27 controls the supply of fluid under pressure from a main reservoir 31 to the pressure chamber 24 by way of pipe 33, passage and pipe 32, and valve chamber 26.

The valve section 22 is also provided with a piston chamber 34 in which is operatively mounted a movable abutment or piston 35. This movable piston is provided with a valve chamber 36 which is continuously in communication with the pressure chamber 24 by way of passage 37.

A release valve 38 is provided within the valve chamber 36 and is surrounded by a release valve spring 39 that is so positioned as to bias it to its unseated position. When the release valve 38 is in its unseated position the pressure chamber 24 is in communication with the atmosphere by way of passage 37, valve chamber 36, passages 41, piston chamber 34, and passage 42.

The movable abutment or piston 35 is subject, on one side, to the pressure in the pressure chamber 24 and, on the other side, to the pressure of a regulating spring 43. The tension of the spring 43 may be regulated by a regulating member 44 positioned in the outer bore of the piston chamber. The member 44 is provided with a bore 45 for receiving a plunger portion 46 extending from the piston 35. An adjusting screw 47 is screw-threadedly attached in the bore of the member 44 for limiting the movement of the piston 35 toward the right. The screw 47 may carry a cap nut 48 for covering the outer end of the piston cylinder.

Mechanism is provided for actuating the supply valve 27 to its unseated position and the release valve 38 to its seated position and comprises a floating pivot carrier member 51 that is slidably interfitted with a bore 52 in the casing of the valve structure for supporting the pivot carrying member.

Upon the floating pivot 53 spaced levers 54 extend upwardly and downwardly and, at their upper end, support a valve stem 55 which fits loosely into a bore 56 in the supply valve 27. Between the lower end of the levers 54 a roller 57 is supported which engages the rounded end portion 58 of the release valve 38.

It should be understood that the supply valve spring 28 exerts a greater force than does the release valve spring 38, and that the regulating spring 43 exerts a greater biasing force than either of the other two springs. Therefore, when the floating pivot carrier 51 is moved to the right the release valve 38 will first be seated and then the supply valve 27 will be unseated. The regulating spring 43 has little effect on the operation of the valves 38 and 27 but provides a flexible cushion for the release valve 38 should it be forced further than required to effect its seating, the entire piston 35 being permitted to move slightly in accordance with further movement of the roller 57.

In order to actuate the floating pivot carrier member 51 and the valves operated thereby, a cam 59 is provided mounted upon an operating shaft 61 of the brake valve device. The shaft 61 is supported upon a step bearing 62 in a footing member 63 and by a sleeve bearing 64 in the upper part of the casing structure 21. The brake valve handle 6 is operatively attached to the shaft 61 and upon its upper end is mounted the electric controller represented by the contact member 13.

The control valve device 4 is provided in its upper portion with a chamber 65 that is permanently connected by port and pipe 66 and pipe 33 to the reservoir 31. A valve chamber 67 is provided below the chamber 65 and is permanently connected by the port and pipe 68 to the lower portion of the raising cylinder 3 and to the left hand portion of the switch cylinder 19. A double beat valve 69 is provided within the chamber 67 and comprises a stem 70 that carries a valve element 71 for closing a passage 72 between the chambers 65 and 67, and a valve element 73 for closing a passage 74 between the chamber 67 and the atmosphere. The upper end of the valve stem 70 presses against a cap 75 that is positioned within a bore in a cap nut 77, and is normally biased downwardly by a spring member 76. The lower end of the valve stem 70 presses against a disc 78 that is urged upwardly by the spring 79, contained in a spring chamber 81, toward a seat in the upper portion thereof in a cap nut 82. A control piston 83, in the upper end of which the spring chamber 81 and the spring 79 are contained, is positioned within a piston chamber 84. A piston spring 85 is provided for normally forcing the piston 83 downwardly, and the lower end of the piston cylinder is connected by port and pipe 86 to the brake cylinder pipe 25 to receive air pressure for biasing the piston 83 upwardly when pressure is applied to the brake cylinder 2.

In the illustrated position of the control valve 69 air is supplied from the reservoir 31 through pipe 33, pipe and port 66, chamber 65, port 72, valve chamber 67, port and pipe 68 to the lower portion of the raising cylinder 3, and to the left hand portion of the switch cylinder 19. The air pressure in the lower portion of the raising cylinder 3 forces the piston 87 upwardly, thus raising the supporting rack 88 and lifting the magnetic track shoe device 1 out of engagement with the rail. At the same time the pressure in the left hand end of the cylinder 19 forces the piston 89 toward the right against the bias of the spring 90 and a connecting rod 91 forces the switch member 18 to its illustrated or circuit interrupting position.

If the motorman wishes to apply the brakes, he moves the handle 6 in a direction to operate the shaft 61 in a counterclockwise direction as viewed from the top. See Figs. 2 and 3. This movement of the shaft 61 forces the face of the cam 59 against the end of the floating pivot carrier device 51, thus moving the pair of spaced levers 54 toward the right to first move the release valve 38 to its seat against the bias of the spring 39, thus cutting off the passage between the pressure chamber 24 and the atmosphere, which leads through the valve chamber 36 as above traced. Further movement of the cam 59 in a counter-clockwise direction causes the stem 55 to press against the supply valve 27 forcing it against the bias of the supply valve spring 28 to unseat it and permit air under pressure to flow from the reservoir 31 through pipe 33, pipe and port 32, and supply valve chamber 26 to the pressure chamber 24. From pressure chamber 24 the air flows through port and pipe 25 to the brake cylinder 2 to apply the friction brake. Air from the pressure chamber 24 also flows through port and pipe 25 and pipe and port 86 to the lower side of the piston 83 in the valve regulating mechanism 4, thus forcing the piston and the valve 69 upwardly.

The spring 79 within the chamber 81 in the upper part of the piston 83 is designed to exert a greater force than the spring 76 in the upper part of the casing structure. The valve 69 will accordingly be forced upwardly and the valve portion 71 thereof will cut off the flow of air through the port 72 leading from the reservoir 31 to the lower part of the raising cylinder chamber 3 and to the left hand portion of the switch cylinder 19. At the same time the valve portion 73 is unseated permitting the flow of air from cylinders 3 and 19 through pipe and port 68, chamber 67, and passage 74 to the atmosphere, thus permitting the track shoe device 1 to be lowered into engagement with the track rail and the switch mechanism 18 to be actuated toward the left by the bias of the spring 90, contained within the switch cylinder 19, to close the switch 18. Since the switch 18 closes a circuit from the trolley 7 through conductor 16, and resistor 17 for energizing the winding of the magnetic shoe device 1, the resistor 17 cuts down the flow of current to a small value, thus permitting only slight energization of the winding of the shoe device. The energization of the track shoe device will therefore not be sufficient to apply the brake to the rail mechanism, but will be sufficient to prevent the shoe device from bouncing about on the rail. If the motorman desires to apply the magnetic track brake, he moves the handle 6 of the brake valve further in a counter-clockwise direction or until the contact member 13 bridges the contact members 11 and 12 to close a circuit from the trolley 7 through conductors 9 and 14 to effect full energization of the windings of the magnetic track shoe device 1.

A release of the brake mechanism is effected by movement of the handle 6 in a clockwise direction as viewed from the top of the brake valve. Upon a sufficient movement of the handle to cause disengagement of the contact member 13 from the contact members 11 and 12, the energization of the windings of the magnetic track shoe device is decreased, partial energization thereof being continued through the resistor 17 and switch 18 as above described. Upon further movement of the handle switch in a clockwise direction the floating pivot carrier 51 is permitted to move to its illustrated position, the spring 28 closing the supply valve 27, thus cutting off the flow of air from the reservoir 31 to the brake cylinder 2 and to the valve piston cylinder 84. The release valve 38 is also actuated to its unseated or illustrated position by the release valve spring 39, thus permitting air under pressure to pass from the pressure chamber 24 to the atmosphere through the port 42, thus releasing the pressure in the brake cylinder 2 and the lower portion of the valve cylinder 84. The brake applied from the pressure cylinder 2 is, accordingly, released, and the piston 83 travels to its lower or illustrated position under pressure of the spring 85.

The downward movement of the piston 83 permits the spring 76 to force the double beat valve 69 downwardly, thus closing the passage 74 leading from the valve chamber 67 to the atmosphere and opening the valve port 72 leading from the reservoir 31 to the valve chamber 67, to permit air, under pressure, to flow to the lower portion of the raising cylinder 3 and to the left hand portion of the switch operating cylinder 19. The supply of air to the raising cylinder 3 forces the piston 87 upwardly which raises the magnetic track shoe device 1 from the rails, and the supply of air under pressure to the switch operating cylinder 19 causes the piston 89 to be moved toward the right against the bias of the spring 90, thus interrupting the circuit through the switch 18.

Fig. 4 discloses a modified form of the mechanism for raising the magnetic track shoe device 1 and for slightly energizing it when lowering it into contact with the track rail. In Fig. 4 two raising cylinders 92 and 93 are provided mounted on the frame of the vehicle, and having pistons 94 and 95 respectively mounted therein for operating the rods 96 and 97 which support the track shoe device 1. A connecting rod 98 is provided for connecting the track shoe device to a bell crank lever 99 pivotally mounted on the support 101, the upwardly extending portion of which is provided with an insulating surface 102 for bearing against a biasing switch member 103 that is normally biased downwardly to engage a switch member 104. Upon lowering of the track shoe device 1, the bell crank member 99 is operated in a clockwise direction as viewed in Fig. 4, thus permitting the switch member 103 to move downwardly and engage the switch member 104 to complete a circuit from the trolley 7 through the resistor 17 and the winding of the track shoe device 1 to slightly energize it.

While I have illustrated and described certain embodiments of my invention it will be apparent that other modifications within the spirit of my invention will occur to one skilled in the art, and I do not wish to be limited otherwise than by the scope of the appended claims.

Having now described my invention, what I claim as new and desire to secure by Letters Patent, is:

1. A brake equipment for traction vehicles, in combination, braking means for the wheels of the vehicle, braking means for producing a braking effect on the track and comprising a magnetic track shoe, means for lowering said track shoe into engagement with the track upon application of said first named braking means, and means actuated upon the lowering of the shoe for causing partial energization only of the magnetic track shoe, and independent means for controlling the energization of the magnetic track shoe to effect a braking action.

2. In a brake equipment for traction vehicles, a magnetic track brake shoe for producing a braking effect on the track, means for moving said shoe out of and into engagement with said track, means actuated upon movement of said shoe into engagement with said tracks for causing partial energization of the brake shoe to prevent it from bouncing on the track rail, and independent means for controlling the energization of the magnetic track shoe to effect a braking action.

3. In a brake equipment for traction vehicles, a magnetic track brake shoe for producing a braking effect on the track rail, means for raising said shoe from, and for lowering said shoe into, engagement with said track rail, means for slightly energizing the track brake shoe upon engagement thereof with the track rail to prevent it from bouncing on the track rail, and independent means for controlling the energization of the magnetic track shoe to effect a braking action.

4. In a brake equipment for traction vehicles, a magnetic track brake shoe for producing a braking effect on the track, means for effecting a slight energization of the track brake shoe upon engagement thereof with the track to prevent its bouncing on the rail, means for raising said shoe from engagement with said track, and means actuated upon the raising of said shoe for interrupting said slight energization of said brake shoe and independent means for controlling the energization of the magnetic track shoe to effect a braking action.

5. In a brake equipment for traction vehicles, a fluid pressure braking means, a magnetic track brake shoe for producing a braking effect on the track rail, means for raising said shoe out of engagement with and lowering said shoe into engagement with said track rail, and control means for effecting the lowering of said brake shoe and the partial energization thereof simultaneously with an application of said fluid pressure braking means, and for effecting the raising of said brake shoe and deenergization thereof simultaneously with the release of said fluid pressure braking means.

6. A brake equipment for traction vehicles, in combination, braking means for exerting a braking torque on the wheels of the vehicle, a braking means for producing a braking effect on the track and comprising a magnetic track shoe, means for lowering said track shoe into engagement with said track upon application of said first named braking means and for simultaneously effecting a partial energization thereof and for simultaneously effecting a raising of said brake shoe and deenergization thereof upon release of said first named braking means, and manually operable means having a service application zone for controlling the application of said first named braking means and an application zone for effecting the joint application of said two named braking means.

7. In a brake equipment for traction vehicles, in combination, braking means for exerting a braking torque on the wheels of the vehicle, a braking means for producing a braking effect on the track and comprising a magnetic track shoe, means for lowering said track shoe into engagement with the track upon the application of said first named braking means and for raising said track shoe from engagement with the tracks upon the release of said first named braking means, control means for effecting a partial energization of said brake shoe while in engagement with said track, and manually operable means having a service application zone for controlling the application of said first named braking means and an application zone for effecting the joint application of said two named braking means.

8. In a brake equipment for traction vehicles, a fluid pressure braking means for exerting a braking force on the wheels of the vehicle, braking means for producing a braking effect directly on the track and comprising a magnetic track shoe and manually operable means for controlling the energization of the magnetic track shoe, and means responsive to changes in the fluid pressure supplied to said first named brake for lowering said track shoe into, and for raising said track shoe out of, engagement with the track and for causing partial energization only of the magnetic track shoe when in engagement with the track.

9. In a brake equipment for traction vehicles, a fluid pressure braking means for exerting a braking force on the wheels of the vehicle including a brake cylinder, braking means for producing a braking effect directly on the track and comprising a magnetic track shoe and manually operable means for controlling the energization of the magnetic track shoe, means for lowering said track shoe into engagement with the track upon application of the first named brake, and means responsive to brake cylinder pressure for causing partial energization only of said magnetic brake shoe upon application of the fluid pressure brake and for discontinuing said partial energization upon release of the fluid pressure braking means.

10. In a brake equipment for traction vehicles, a fluid pressure braking means for exerting a braking force on the wheels of the vehicle including a brake cylinder, braking means for producing a braking effect directly on the track and comprising a magnetic track shoe and manually operable means for controlling the energization of the magnetic track shoe, separate means comprising an electric circuit and a switch therein for controlling the partial energization of said track shoe, means controlled in accordance with brake cylinder pressure for lowering said track shoe into engagement with the track upon application of the fluid pressure brake and for raising said track shoe out of engagement with the track upon release of the fluid pressure brake, and means controlled in accordance with brake cylinder pressure for controlling the operation of said switch.

11. In a brake equipment for traction vehicles, a brake cylinder, braking means comprising a magnetic track shoe and manually operable means for controlling the energization of the magnetic track shoe, means for lowering the track shoe into engagement with the track upon supplying air under pressure to the brake cylinder, and means responsive to brake cylinder pressure for causing partial energization only of said magnetic track shoe and for discontinuing said partial energization upon the release of air from said brake cylinder.

12. In a brake equipment for traction vehicles, a magnetic track brake shoe for producing a braking effect on the track rail, pressure responsive means for raising said shoe out of engagement from and for lowering said shoe into engagement with said track rail, pressure responsive means for effecting a partial energization of said track shoe, and pressure responsive control means for simultaneously effecting the operation of said last two means to partially energize said track shoe upon lowering it into engagement with the track rail and for interrupting such partial energization thereof upon the raising of said track shoe from the track rail.

13. In a brake equipment for traction vehicles, in combination, a brake cylinder, manually operable means for controlling the supply of fluid under pressure to said brake cylinder, a magnetic track shoe, a pressure responsive device for raising and lowering said magnetic track shoe into and out of engagement with said track rail, a pressure responsive device operative in accordance with brake cylinder pressure for controlling the raising and lowering device and for effecting a slight energization only of said magnetic brake shoe when lowered into engagement with the track, and additional means for effecting a substantial energization of said magnetic brake shoe to effect braking action.

14. In a brake equipment for traction vehicles, in combination, a brake cylinder, manually operable means for controlling the supply of fluid under pressure to said brake cylinder, a magnetic track shoe, a pressure responsive device for raising and lowering said magnetic track shoe to control its engagement with the track rail, means including a switch for closing a circuit to effect a slight energization only of said magnetic track shoe, a pressure responsive device operated in accordance with brake cylinder pressure for controlling the raising and lowering device, a switch for effecting a slight energization of said magnetic brake shoe when lowered into engagement with the track, and means for effecting a substantial energization of said magnetic brake shoe to effect a braking action.

15. In a brake equipment for traction vehicles, in combination, a brake cylinder, manually operable means for controlling the supply of fluid under pressure to said brake cylinder, a magnetic track shoe, a pressure responsive device for raising and lowering said magnetic track shoe to control its engagement with the track rail, means including a pressure operated switch for closing a circuit to effect a slight energization of said magnetic track shoe, and means operative in accordance with brake cylinder pressure for controlling the supply of fluid under pressure to said raising and lowering device and to said pressure operated switch for effecting the closing of said switch upon the lowering of the magnetic track shoe into engagement with the track rail, and means for effecting a substantial energization of said magnetic track shoe to effect a braking action.

CLYDE C. FARMER.